Oct. 8, 1968  D. J. SOLTZ  3,405,048
APPARATUS FOR MEASURING pH WITH TEMPERATURE
COMPENSATING DIODE MEANS
Filed July 1, 1965

INVENTOR.
DANIEL J. SOLTZ
BY
ATTORNEY.

United States Patent Office 3,405,048
Patented Oct. 8, 1968

3,405,048
APPARATUS FOR MEASURING pH WITH TEMPERATURE COMPENSATING DIODE MEANS
Daniel J. Soltz, Elkins Park, Pa., assignor to Honeywell Inc., Minneapolis, Minn., a corporation of Delaware
Filed July 1, 1965, Ser. No. 468,681
3 Claims. (Cl. 204—195)

This invention relates to pH measuring apparatus. More specifically, the present invention relates to thermal compensation for pH measuring and controlling apparatus.

An object of the present invention is to provide an improved temperature compensation means for a pH measuring and controlling system.

Another object of the present invention is to provide an improved temperature compensation means for a pH measuring and controlling system having a glass electrode measuring element.

A further object of the present invention is to provide an improved automatic and continuous temperature compensating means for a glass electrode pH measurnig and controlling apparatus to maintain the pH of a test solution.

A still further object of the present invention is to provide an improved glass electrode temperature compensating means, as set forth herein, having a simple operation and construction.

In accomplishing these and other objects, there has been provided, in accordance with the present invention, an improved temperature compensating means for a glass electrode pH measuring device comprising a semi-conductor diode which is suspended in the solution to be tested by a thermally conductive fluid-tight enclosure. Electrical connections are made to the dioed to connect it in series with the glass electrode. A current bias source may be connected to the diode to bias the diode to a particular operating point in order to achieve a desired temperature compensation of the glass electrode. The output signal from the pH measuring apparatus is applied to a pH control device to control the pH of the test solution at a desired pH.

A better understanding of the present invention may be had when the following detailed description is read in connection with the accompanying drawing in which.

Figure 1:
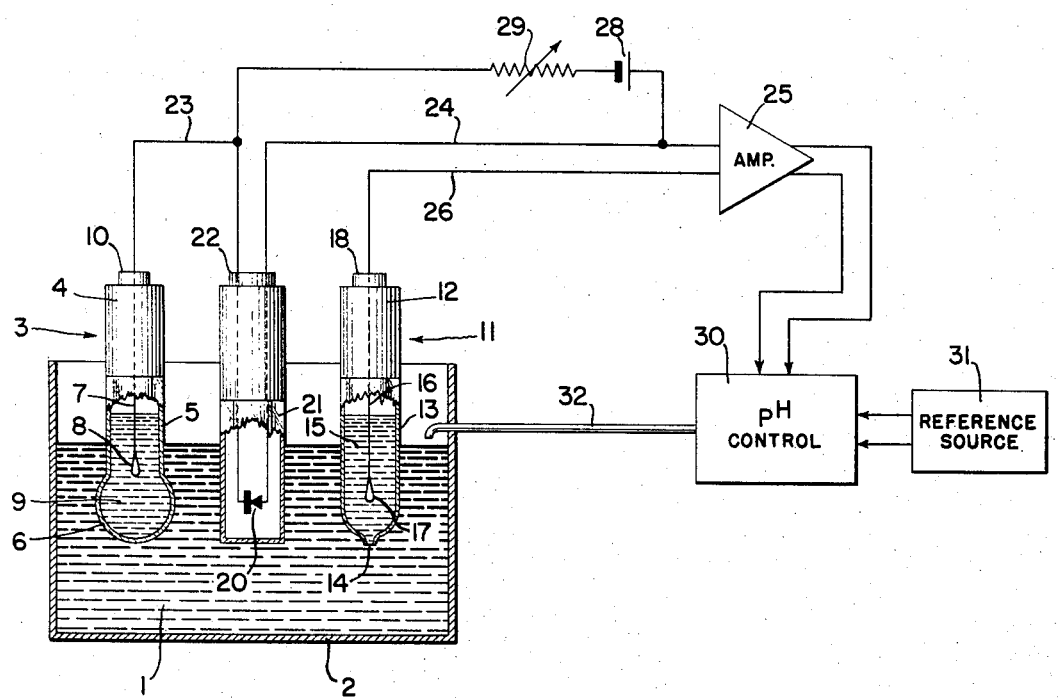
FIG. 1 is a pictorial illustration of a pH measuring and controlling system embodying the thermal compensation means of the present invention.

Referring to FIG. 1 in more detail, there is shown a pH measuring apparatus arranged to measure the pH of a fluid 1 in a tank 2. A measuring electrode 3 is suspended in contact with the fluid 1 to provide sensing means for the pH measurement. These electrodes are well known in the art and, briefly, comprise a rigid electrically insulating cap 4 attached to one end of a glass tube 5. The other end of the glass tube 5 is provided with a pH sensitive glass bulb 6. A silver wire 7 having a coating of silver chloride 8 is positioned within the cell 3 with the silver chloride in contact with a known buffer solution 9. The solution 9 is arranged to fill the inside of the tube 5 and bulb 6. An electrical contact 10 is provided on the cap 4 to effect an electrical connection to the wire 7.

A reference electrode 11, is, also, suspended in contact with the test fluid 1. This reference electrode is, also, well known in the art and comprises an electrically insulating cap 12 mounted on one end of a glass tube 13. The other end of the glass tube 13 is sealed except for a capillary liquid path 14 forming a liquid junction between a buffer solution 15 in the tube 13 and the test fluid 1. A silver wire 16 having a coating of silver chloride 17 is suspended within the tube 13 with the coating 17 in contact with the solution 15. A terminal 18 is provided on the cap 12 to effect an electrical contact with the wire 16.

In operation, the measuring electrode 3 is effective to develop, at the exterior surface of the bulb 6, a potential which is proportional to the active hydrogen ion concentration in the test fluid 1. This potential is compared with a reference potential which is developed within the reference electrode 11 through contact of the silver chloride coating 17 and the buffer solution 15. The liquid junction 14 is effective to provide an electrical path between the interior of the reference electrode 11 and the measuring electrode 3. Thus, the two electrodes may be connected by means of the terminals 10 and 18 into an electrical circuit to measure the difference between the measuring potential and the reference potential. This difference potential is amplified and applied to a meter which is calibrated with a pH scale.

In practice, it has been found that the potential developed at the measuring electrode 3 is dependent on the temperature of the test fluid 1. The effect of this temperature relationship is to make the reading of fluid pH erroneous unless a compensation for the temperature error is provided. One way of achieving this result is to provide calibration curves of pH versus measuring potential at various temperatures. By measuring the temperature of the test fluid 1, a correction from the appropriate curve may be effected. However, in order to avoid such a laborious manual correction, it is desirable to automatically correct for the aforesaid temperature error. The present invention is directed toward a temperature compensating means which is effective to automatically temperature compensate the measuring electrode. This compensating means includes a semiconductor diode 20 which is suspended within a thermally conductive housing 21. This housing 21 is preferably made of an inert material to enable the housing 21 to be placed in contact with the test fluid 1. A terminal means 22 is provided on the housing 21 to effect separate electrical contacts to both sides of the diode 20. The electrodes 3 and 11 and the compensating means may be attached to a common supporting structure, not shown, to facilitate use of the assembly.

The terminal 10 is connected to one side of the diode 20 by a wire 23 through the terminal means 22. The other side of the diode 20 is connected by a wire 24 to a first input terminal of an amplifier 25. The other input terminal of the amplifier 25 is connected by a wire 26 to the terminal 18 of the reference electrode 11. The return path, of course, is then completed through the test fluid 1. A battery 28 and a variable resistor 29 are connected in series across the diode 20 by being connected to the wires 23 and 24. The output of the amplifier 25 is applied to a pH control device 30. The output signal from the amplifier 25 is compared with a reference signal from a reference source 31. The pH control apparatus 30 is connected to the test fluid 1 by a pipe 32 which is arranged to supply appropriate pH affecting chemicals from the pH control 30 to the test fluid 1.

It has been found that the temperature dependence of the measuring electrode 3 is approximately an increase of 0.2 millivolt for an increase of one degree centigrade per pH. The forward voltage drop of the diode 20 is, also, temperature dependent of substantially the same magnitude as the measuring electrode. However, the change in voltage drop of the diode 20 is effective to subtract from the measuring potential to effect an automatic and continuous temperature compensation. The battery 28 and resistor 29 are provided to adjust the operating point of the diode 20 by supplying a current in the forward direction through the diode 20. Thus, the diode operating point may be adjusted, if necessary, to provide the desired temperature compensation. It is to be noted that a transistor may be substituted for the diode using the base-emitter junction.

The output signal from the amplifier 25 is applied to the pH control apparatus 30 where it is compared with a reference signal representative of a pH potential at the desired pH. A deviation from this reference signal is indicative of a change in the pH of the test fluid 1 since the temperature compensating means of the present invention is effective to eliminate any change in the amplifier output signal due to temperature change of the test fluid 1. Thus, the amplifier output signal is a true indication of the pH variations of the test fluid 1. The pH control apparatus 30 is arranged to supply appropriate chemicals through a connecting pipe 32 to restore the pH of the test fluid 1 to the desired pH and to maintain a continuous control action at this pH level by a continuous comparison with the signal from the reference source 31.

Figure 2:
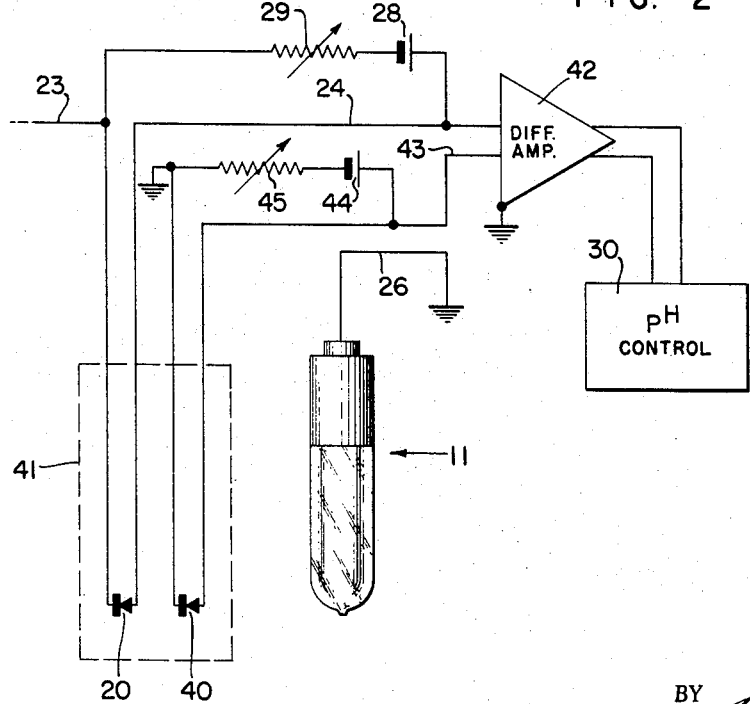
FIG. 2 is a pictorial illustration of a modification of the system shown in FIG. 1 and, also, embodying the present invention.

In FIG. 2, there is shown a modification of the temperature compensating circuit shown in FIG. 1. Similar reference numbers have been used in FIG. 2 to indicate similar elements to those in FIG. 1, and part of FIG. 1 has been omitted for the sake of clarity since the omitted components would be the same as shown in FIG. 1. The circuit shown in FIG. 2 is used to provide a temperature for the pH measurement where the range of compensation required is smaller than the available temperature coefficient of a single diode. In order to achieve such a small temperature compensation, a second diode 40 is provided within an enclosure 41 housing the first diode 20. The enclosure 41 would be suspended in a test solution, as described above with respect to FIG. 1, to thermally expose the diodes 20 and 41 thereto while providing electrical insulation. A differential amplifier 42 is provided to sense the difference in signal applied to its inputs. One input signal for amplifier 42 is obtained from the first diode 20 over line 24. A second input signal for the amplifier 42 is obtained from the second diode 40 over a wire 43 connected to the same side as that to which line 24 is connected on the first diode 20. A second unidirectional source 44 is connected in series with an adjustable resistor 45 across the second diode 40. A ground return connection is provided to the other side of the diode 40 from that connected to the wire 43. The wire 26 connected to the reference electrode 26 is, also, grounded to complete a return path to the amplifier 42 for the first diode 20. The diodes 20 and 40 are arranged to provide a difference signal to the amplifier 42 which is the desired temperature compensation coefficient for the measuring electrode 3. Since both diodes will change their voltage drops with temperature, the compensation difference will, also, change per degree temperature change and continuously compensate the aforesaid change in measuring electrode.

Accordingly, it may be seen that there has been provided, in accordance with the present invention, a temperature compensating means for a glass electrode pH measuring and controlling apparatus to effect a continuous and automatic temperature compensation for the measuring and controlling apparatus to provide a pH control at a desired pH of a test fluid.

What is claimed is:

1. In a pH measuring and controlling apparatus having a glass measuring electrode, a reference electrode, amplifying means arranged to amplify a difference in potential between said measuring electrode and said reference electrode, as a representation of the pH of a test fluid and pH control apparatus responsive to an output signal from said amplifying means and arranged to control the pH of said test fluid at a desired pH, the improvement comprising a rectifying semiconductor means having a forward voltage drop having a temperature dependence which is substantially the same as that of the measuring electrode, thermally conductive, electrically insulating means enclosing said rectifying means and adapted to thermally expose said rectifying means to said test fluid while electrically isolating said rectifying means from said test fluid, and circuit means connecting said rectifying means in series with said measuring electrode such that the voltage drop across the said rectifying means is subtracted from the potential between the said electrodes.

2. A pH measuring apparatus as set forth in claim 1 wherein said rectifying means is a semiconductor diode.

3. A pH measuring apparatus as set forth in claim 1 wherein a unidirectional source of voltage and a variable resistor are connected in said series across said rectifying means in a forward direction.

References Cited

UNITED STATES PATENTS

| | | | |
|---|---|---|---|
| 2,232,211 | 2/1941 | Cary | 204—195.1 |
| 2,563,062 | 8/1951 | Perley | 204—195.1 |
| 2,986,511 | 5/1961 | Digby | 204—195.1 |
| 3,092,998 | 6/1963 | Barton | 317—235.29 |
| 3,235,477 | 2/1966 | Keyser et al. | 204—195 |

JOHN H. MACK, *Primary Examiner.*

T. TUNG, *Assistant Examiner.*